(12) United States Patent
Eggleton et al.

(10) Patent No.: US 6,438,277 B1
(45) Date of Patent: Aug. 20, 2002

(54) STABILIZED THERMALLY TUNABLE OPTICAL WAVEGUIDE DEVICES AND COMMUNICATION SYSTEMS EMPLOYING THEM

(75) Inventors: Benjamin John Eggleton, Summit; John A. Rogers, New Providence, both of NJ (US)

(73) Assignee: Fitel USA Corp., Norcross, GA (US)

( * ) Notice: Subject to any disclaimer, the term of this patent is extended or adjusted under 35 U.S.C. 154(b) by 0 days.

(21) Appl. No.: 09/325,448

(22) Filed: Jun. 3, 1999

(51) Int. Cl.[7] .................................................. G02F 1/01

(52) U.S. Cl. ................................................ 385/1; 385/37

(58) Field of Search ........................... 385/37.1, 8, 10, 385/7; 359/161, 179, 160, 130; 372/6

(56) References Cited

U.S. PATENT DOCUMENTS

| 5,159,601 A | * | 10/1992 | Huber ............................ 372/6 |
| 5,557,442 A | * | 9/1996 | Huber ........................ 359/179 |
| 5,682,445 A | * | 10/1997 | Smith ............................. 385/7 |
| 5,949,925 A | * | 9/1999 | Seino ............................. 385/1 |
| 5,987,200 A | * | 11/1999 | Fleming et al. ................ 385/37 |
| 6,078,418 A | * | 6/2000 | Hansen et al. .............. 359/161 |

* cited by examiner

Primary Examiner—Ellen E. Kim
(74) Attorney, Agent, or Firm—Lowenstein Sandler PC

(57) ABSTRACT

In accordance with the invention, a thermally tunable optical waveguide device is stabilized against ambient changes. Specifically, a feedback signal derived from a temperature-dependent resistance is used to stabilize the device with respect to ambient changes that could otherwise alter the temperature. Specific embodiments include resistance-heated tunable gratings.

5 Claims, 4 Drawing Sheets

STABILIZED THERMALLY TUNABLE OPTICAL WAVEGUIDE DEVICES AND COMMUNICATION SYSTEMS EMPLOYING THEM

FIELD OF THE INVENTION

This invention relates to thermally tunable optical waveguide devices of enhanced stability and to optical communication systems employing them.

BACKGROUND OF THE INVENTION

Optical fiber communication systems are beginning to achieve their great potential for the rapid transmission of vast amounts of information. In essence, an optical fiber system comprises a light source, a modulator for impressing information on the light, an optical fiber transmission line for carrying the optical signals, and fiber amplifiers for amplifying the signals along the transmission path. It also includes a receiver for detecting the signals and for demodulating the information they carry. Increasingly, the optical signals are wavelength division multiplexed signals (WDM signals) comprising a plurality of distinct wavelength signal channels.

Practical systems must also include a variety of tunable or switchable components for compensating the chromatic dispersion of transmitted signals, routing signals among different paths in the network and compensating nonlinear effects such as the wavelength-dependent gain fiber amplifiers.

Thermally tunable waveguide devices are attractive for active routing, for compensation of dispersion and for flattening amplifier gain. The physical dimensions and refractive index of light-transmitting materials can be controllably varied by changing the temperature. This permits fine tuning of devices whose operating characteristics depend critically upon index and dimensions. For example, variation of the temperature can be used to tune the wavelength at which Bragg gratings will reflect, the wavelength of peak loss for long period gratings, and even the degree of chirp in a grating.

Thermally tunable Bragg gratings essentially comprise lengths of optical waveguide including periodic perturbations in the refractive index which are spaced apart by a distance which is smaller than the transmitted wavelengths. A current-controlled thin-film resistive heater along the length of the grating can fine-tune the perturbation spacing, and thereby tune the reflected wavelength or the grating chirp. Such devices are described in greater detail in the following four articles which are incorporated herein by reference. (H. G. Limberger, N. H. Ky, D. M. Costantini, R. P. Salathe, C. A. P. Muller and G. R. Fox "Efficient Miniature Fiber-Optic Tunable Filter Based on Intracore Bragg Grating and Electrically Resistive Coating," IEEE Photonics Technology Letters 10(3), March 1998, p.361–363; G. R. Fox, C. A. P. Muller, N. Setter, D. M. Costantini, N. H. Ky and H. G. Limberger, "Wavelength Tunable Fiber Bragg Grating Devices Based on Sputter Deposited Resistive and Piezoelectric Coatings," Journal of Vacuum Science and Technology Part B, 15(3), May/June 1997, p. 1791–1795; B. J. Eggleton, J. A. Rogers, T. A. Strasser, "Optical Grating Devices With Adjustable Chirp," U.S. patent application, Ser. No. 09/183,048, is now U.S. Pat. No. 6,275,629; K. R. Amundson, B. J. Eggleton, R. J. Jackman, J. A. Rogers and T. A. Strasser, "Thermally Adjustable Optical Fiber Grating Device With Packaging For Enhanced Performance, U.S. patent application Ser. No. 09/252,708 filed Feb. 2, 1999, is now U.S. Pat. No. 6,370,300).

Thermally tunable long period gratings similar to tunable Bragg gratings except that the perturbations are spaced apart by a distance which is larger than the transmitted wavelengths. They operate by controlling the loss of different modes of transmitted light. Thin film resistive heaters can control the wavelength of greatest loss or the grating chirp. Such devices are described in greater detail in the following two articles which are incorporated herein by reference. (D. M. Costantini, H. G. Limberger, R. P. Salathe, C. A. P. Muller and S. A. Vasiliev, "Tunable Loss Filter Based on Metal Coated Long Period Grating," Optical Fiber Conference Proceedings, 1998 and A. A. Abramov, B. J. Eggleton, J. A. Rogers, R. P. Espindola, A. Hale, R. S. Windeler and T. A. Strasser, "Electrically tunable efficient broadband long-period fiber grating filter," *IEEE Photonics Technology Letters*, 11(4), 445 (1999).

As the desire for increased bandwidth requires additional and more closely spaced signal channels, the demands for stability of thermally tuned components becomes increasingly stringent. Because these components rely on heating, their operation can be affected by changes in ambient conditions such as temperature, humidity and air flow. Their operation can even be affected by the thermal mass of bulky temperature sensors. Even if the components are well isolated from their surroundings, they are sensitive to slight fluctuations in the thermal properties of their surroundings, and the more efficient they are, the greater the sensitivity. This sensitivity can produce undesirable changes in the transmitted signals.

Accordingly there is a need for stabilized thermally tunable optical devices.

SUMMARY OF THE INVENTION

In accordance with the invention, a thermally tunable optical waveguide device is stabilized against ambient changes. Specifically, a feedback signal derived from a temperature-dependent resistance is used to stabilize the device with respect to ambient changes that could otherwise alter the temperature. Specific embodiments include resistance-heated tunable gratings.

BRIEF DESCRIPTION OF THE DRAWINGS

The nature, advantages and various additional features of the invention will appear more fully upon consideration of the illustrative embodiments now to be described in detail in connection with the accompanying drawings. In the drawings.

It is to be understood that these drawings are for purposes of illustrating the concepts of the invention and, except for the graphs, are not to scale.

DETAILED DESCRIPTION

Figure 1:
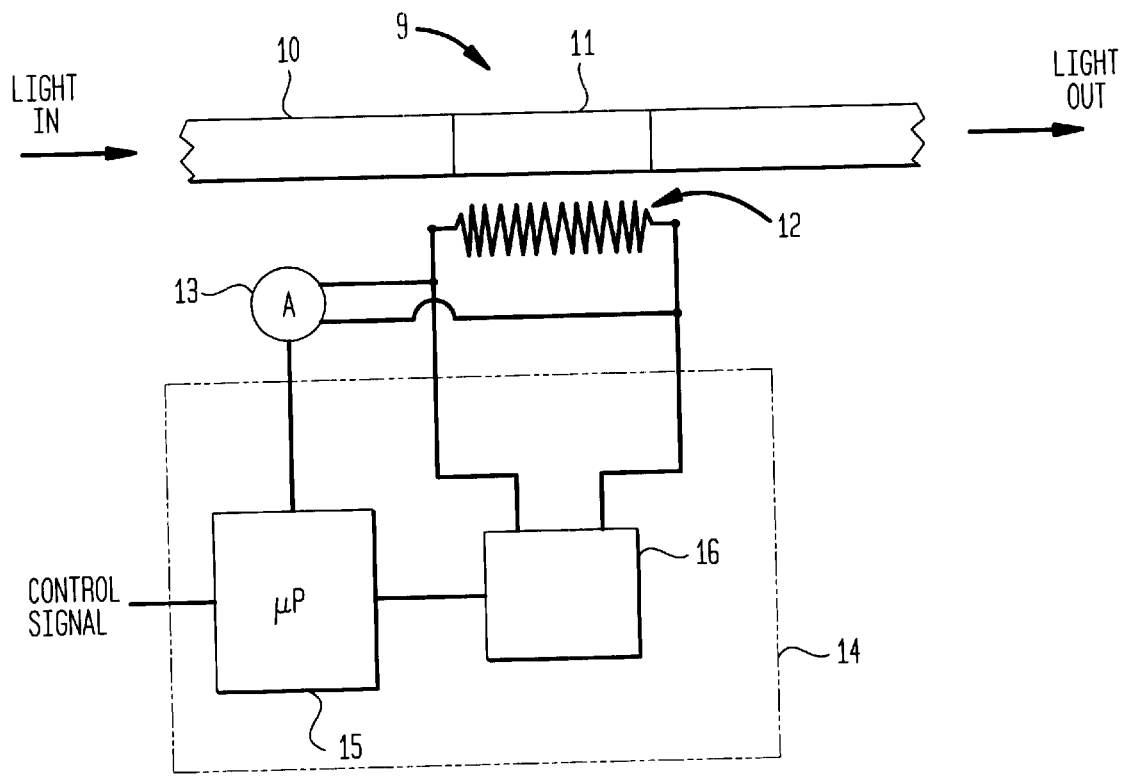
FIG. 1 is a schematic diagram of a thermally tunable optical waveguide device stabilized in accordance with the invention.

Referring to the drawings, FIG. 1 is a schematic diagram of a thermally tunable optical device 9 stabilized in accordance with the invention. The device 9 comprises a length of optical waveguide 10 thermally sensitive optical element 11, an electrical resistance heater 12 for heating element 11, a controllable current source 13 for supplying current to the heater 12 and a control circuit 14 for controlling the current source 13.

The control circuit 14 advantageously comprises a microprocessor controller 15 and a resistance detector 16 (ohmmeter). The resistance detector 16 is coupled to resistance heater 12 to measure its resistance, and the output of detector 16 is supplied to the controller 15. The controller 15 also receives a primary control signal indicative of a desired setting for the tunable optical device.

In typical embodiments, the waveguide 10 will be an optical fiber or a planar waveguide. The thermally sensitive optical element 11 will comprise a grating, an amplifier, a resonance ring or a solid body resonance cavity. The heater 12 can be a thin film resistance heater thermally coupled to the optical element 11.

In operation, the temperature of optical element 11 is primarily controlled by the primary control signal applied to the control circuit 14. But ambient variations inducing temperature changes in the heater 12 produce changes in its temperature-dependent resistance. The controller 15, supplied with these resistance changes, generates a negative feedback signal to the current source to stabilize the temperature against the ambient-induced variations.

In more complex components using a plurality of elements 11, such as a serial array of Bragg gratings, a single controller 15 can determine a plurality of feedback signals for a respective plurality of elements 11. Similarly, a single element 11 such as a long grating can use a plurality of heaters 12 and a single controller 15 can determine a respective plurality of feedback signals.

It is also possible to use one resistive element for the heater and a separate temperature-dependent resistive element for the temperature sensor, as by placing the heater and sensor in parallel stripes along the waveguide.

Figure 2:
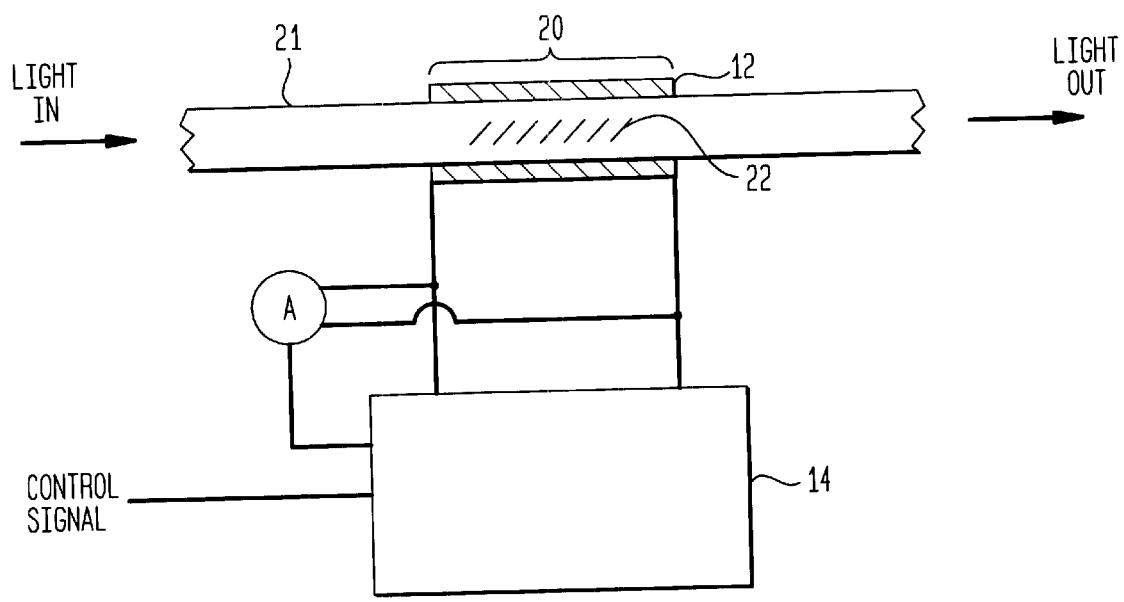
FIG. 2 illustrates a specific embodiment of the component of FIG. 1 wherein the tunable device is a grating.

FIG. 2 illustrates a specific embodiment of the FIG. 1 component wherein the thermally tunable element 11 comprises a fiber grating 20 composed of a length of optical fiber 21 including a plurality spaced apart index perturbations 22. The heater 12 is a thin resistive film disposed on the outer periphery of the fiber 21 overlying the perturbations. The grating 20 can be a Bragg grating or a long period grating depending on the spacing between perturbations.

The invention may now be understood by consideration of the following specific example.

EXAMPLE

A tunable add/drop filter can be constructed using a uniform thin coating of 6000 Å Au/50 Å Ti on the cladding of a fiber that contains a conventional apodized Bragg grating. Passing current through the metal coating causes Joule heating of the fiber. This heating causes, primarily through the thermo-optic effect, a shift of the peak of the Bragg resonance. A package that consists of a thin plastic tube with rubber seals on its end provides some degree of isolation of the fiber from air currents, that can cause undesirable fluctuations in the temperature and, in turn, the optical characteristics of the device. Constructing a package that makes the operating temperature of the device completely independent of its surroundings is difficult.

Figure 3:
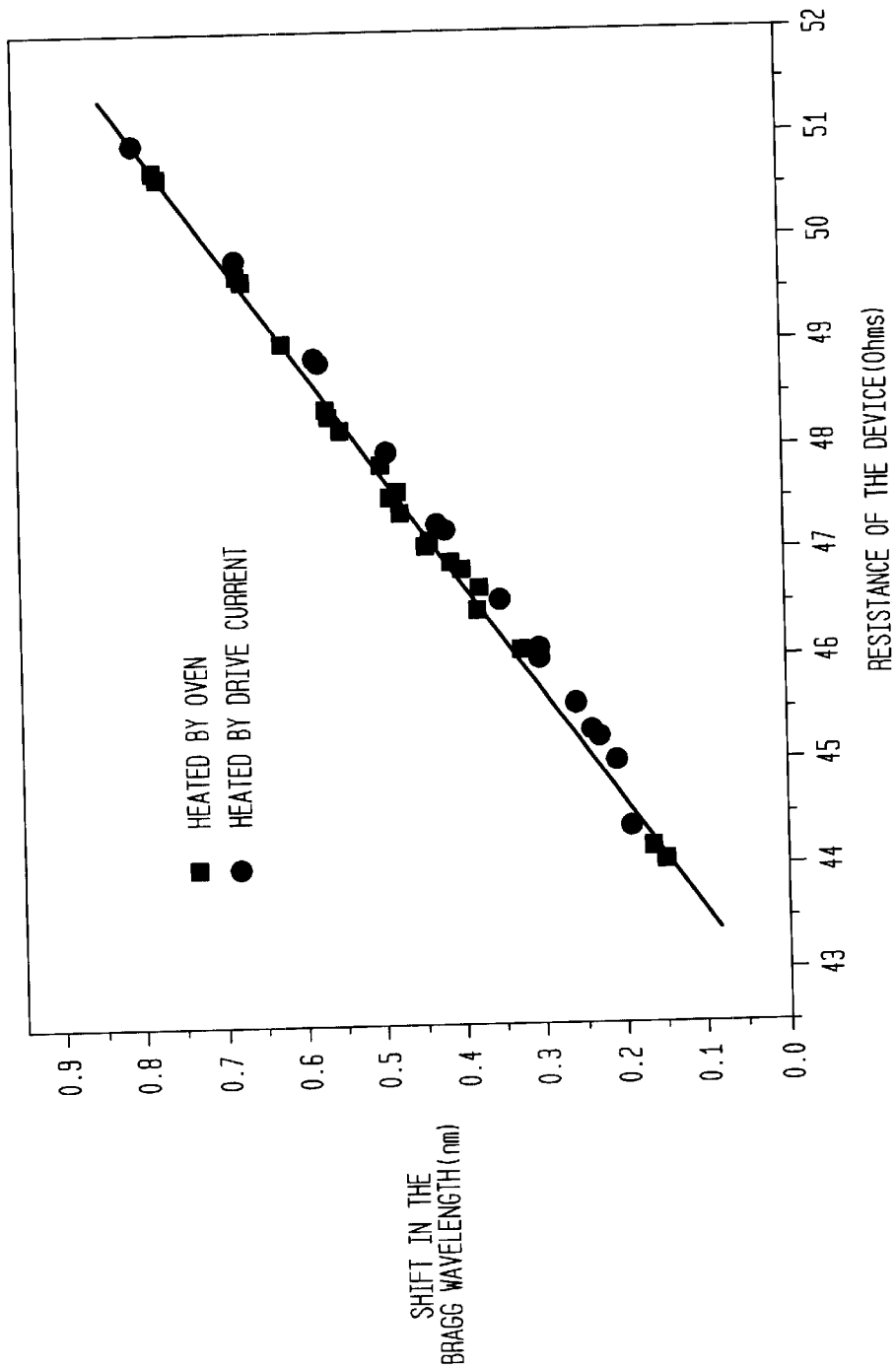
FIGS. 3 and 4 are graphical illustrations useful in understanding the operation of the invention.

In order to allow long-term, stable operation and fast switching, we use the measured resistance of the coating to provide an accurate measurement of the temperature of the device. That is, the heater itself is used as a sensitive sensor of temperature. FIG. 3 shows the shift of the Bragg reflection as a function of measured resistance during operation of a device at various currents. It also shows the shift of the Bragg reflection as a function of resistance measured when a non-operating device is heated in a conventional bulk oven. The close agreement of the resistances measured in these two cases establishes the correspondence between the resistance measured during operation and actual temperature of the device.

Figure 4:
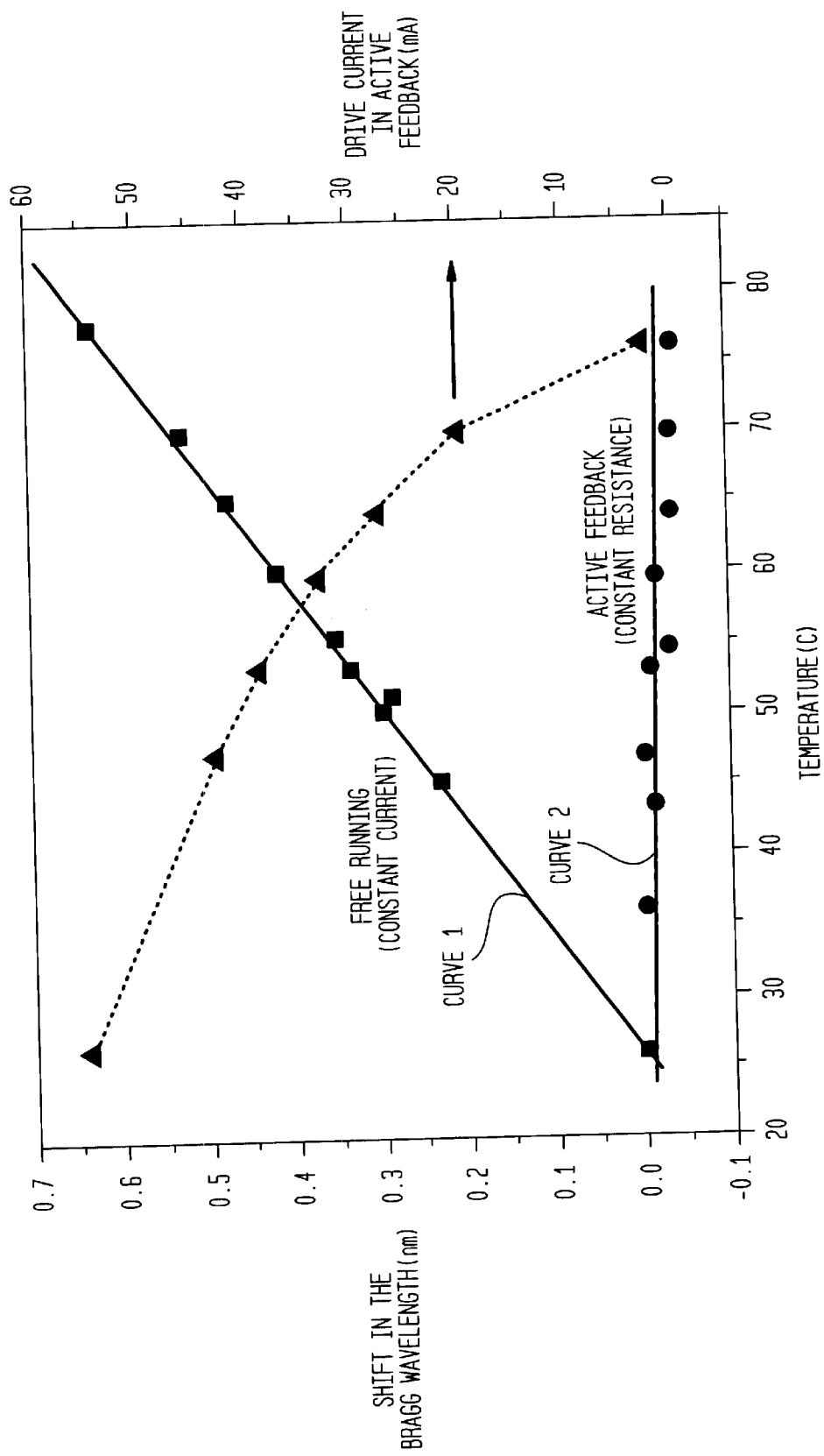

The temperature evaluated by measuring the resistance of the heater can be used in a conventional feedback-loop to control the current applied to the heater and, therefore, the temperature of the fiber. FIG. 4 illustrates in curve 1 the characteristics of a device operated at constant current (i.e. no feedback) and in curve 2 with feedback that controls the applied current to maintain a constant device resistance (i.e. temperature). As the data indicate, without feedback, the devices are highly sensitive to the temperature of its surroundings. When operated with feedback, however, the temperature sensitivity is eliminated.

Figure 5:
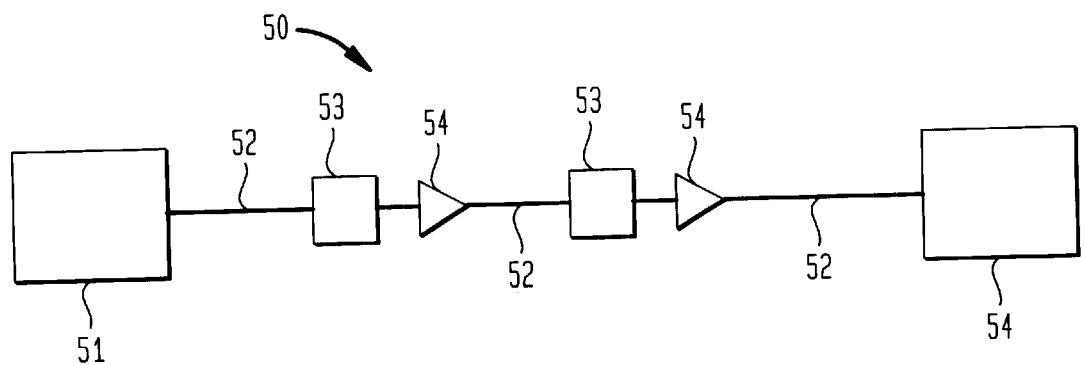
FIG. 5 illustrates an optical communication system employing one or more devices in accordance with FIG. 1.

FIG. 5 schematically illustrates a WDM optical fiber communication system 50 comprising a multiwavelength optical transmitter 51, segments of transmission fiber 52, one or more dispersion compensating grating device 53, and one or more optical fiber amplifiers 54. It also includes one or more multiwavelength optical receives 54. Long systems may also include one or more add/drop nodes (not shown) between successive transmission fiber segments 52.

Typical dispersion compensating grating devices are described in U.S. Pat. No. 4,953,939 issued to R. E. Epworth on Sep. 4, 1990 and U.S. Pat. No. 5,701,188 issued to M. Shigematsu et al. on Dec. 23, 1997, which are incorporated herein by reference. The devices comprises linear arrays of chirped Bragg gratings arranged to reflect slower propagating wavelengths first and faster propagating wavelengths last, thereby compensating chromatic dispersion. One or more of the Bragg gratings in the array is advantageously stabilized against ambient changes as described in connection with FIGS. 1 and 2 herein.

A typical optical fiber amplifier has a wavelength-dependent gain. This wavelength-dependence may be flattened by one or more long-period gratings. See U.S. Pat. No. 5,430,817 issued to A. M. Vengsarkar on Jul. 4, 1995, which is incorporated herein by reference. Each of the long period gratings is advantageously a thermally tunable grating and stabilized against ambient changes as described in connection with FIGS. 1 and 2 herein.

In addition add/drop nodes advantageously use thermally tunable Bragg gratings to control and route individual signal channels. See U.S. patent application Ser. No. 09/288,202 filed by C. Madsen on Apr. 8, 1999 and entitled "Reconfigurable Add/Drop For Optical Fiber Communication Systems", which is incorporated herein by reference. Each of these Bragg gratings are advantageously stabilized against ambient changes as described in connection with FIGS. 1 and 2 herein.

It is to be understood that the above-described embodiments are illustrative of only a few of the many possible specific embodiments which can represent applications of the principles of the invention. Numerous and varied other arrangements can be readily devised by those skilled in the art without departing from the spirit and scope of the invention.

What is claimed is:

1. A thermally tunable optical waveguide device comprising:
- a length of optical waveguide including a thermally sensitive optical element;
- a controllable heater comprising a coating of temperature-dependent resistive material on the waveguide for heating the thermally sensitive element;
- a resistive detector coupled to the temperature-dependent resistive coating; and
- a feedback circuit responsive to the output of the detector for providing a feedback signal to the controllable heater.

2. A tunable device according to claim 1 wherein the length of optical waveguide comprises a length of optical fiber.

3. A tunable device according to claim 1 wherein the thermally sensitive optical element comprises an optical grating, optical ring resonator, waveguide amplifier or optical cavity.

4. A tunable device according to claim 1 wherein the feedback circuit provides a feedback signal for maintaining constant temperature.

5. An optical communication system comprising a thermally tunable waveguide device according to claim 1.

* * * * *